United States Patent
Xiao et al.

(10) Patent No.: US 12,060,208 B2
(45) Date of Patent: Aug. 13, 2024

(54) GRADIENT SLOW-RELEASE ACTIVE COMPOSITE FILM AND PREPARATION METHOD THEREOF

(71) Applicant: SOUTH CHINA AGRICULTURAL UNIVERSITY, Guangdong (CN)

(72) Inventors: Jie Xiao, Guangdong (CN); Xia Chen, Guangdong (CN); Jiyang Cai, Guangdong (CN); Hongsheng Liu, Guangdong (CN); Wenbo Wang, Guangdong (CN)

(73) Assignee: SOUTH CHINA AGRICULTURAL UNIVERSITY, Guangdong (CN)

( * ) Notice: Subject to any disclaimer, the term of this patent is extended or adjusted under 35 U.S.C. 154(b) by 303 days.

(21) Appl. No.: 17/261,576

(22) PCT Filed: Jul. 6, 2020

(86) PCT No.: PCT/CN2020/100484
§ 371 (c)(1),
(2) Date: Jan. 20, 2021

(87) PCT Pub. No.: WO2020/239139
PCT Pub. Date: Dec. 3, 2020

(65) Prior Publication Data
US 2021/0261311 A1    Aug. 26, 2021

(30) Foreign Application Priority Data
May 31, 2019 (CN) .......................... 201910472015.0

(51) Int. Cl.
*B65D 65/46* (2006.01)
*B32B 5/14* (2006.01)
(Continued)

(52) U.S. Cl.
CPC ............ *B65D 65/463* (2013.01); *B32B 5/145* (2013.01); *B32B 5/16* (2013.01); *B32B 9/02* (2013.01);
(Continued)

(58) Field of Classification Search
CPC ......... B65D 65/463; B32B 5/16; B32B 5/145; B32B 9/02; B32B 9/048; B32B 2264/502;
(Continued)

(56) References Cited

U.S. PATENT DOCUMENTS

2012/0039981 A1* 2/2012 Pedersen .................. A23G 4/12
424/440

FOREIGN PATENT DOCUMENTS

| CN | 108163369 | 6/2018 |
| CN | 109454945 | 3/2019 |
| CN | 110202860 | 9/2019 |

OTHER PUBLICATIONS

Chen Xia, Multilayer Zein Gelatin Films with tunable water barrier property and prolonged antioxidant activity, 2018, pp. 1-10 (Year: 2018).*

(Continued)

*Primary Examiner* — Alicia J Weydemeyer
*Assistant Examiner* — Laura B Figg
(74) *Attorney, Agent, or Firm* — JCIPRNET

(57) ABSTRACT

The present invention discloses a gradient slow-release active composite film and a preparation method thereof. The active composite film, from inside to outside, is composed of an antioxidative hygroscopic internal layer, at least one gradient anti-microbial antioxidative intermediate layer and at least one waterproof external layer; wherein the antioxidative hygroscopic internal layer is prepared by an alcohol-soluble protein-water-soluble protein substrate and a water-soluble antioxidant; the gradient anti-microbial (Continued)

antioxidative intermediate layer is prepared by an alcohol-soluble protein-water-soluble protein substrate and a lipid-soluble plant essential oil and a water-soluble antioxidant, wherein a mass ratio of the alcohol-soluble protein to the water-soluble protein is (1-2):(1-2); and the waterproof external layer is composed of a hydrophobic alcohol-soluble protein layer.

20 Claims, 1 Drawing Sheet

(51) Int. Cl.
    *B32B 5/16*           (2006.01)
    *B32B 9/02*           (2006.01)
    *B32B 9/04*           (2006.01)

(52) U.S. Cl.
    CPC .......... *B32B 9/048* (2013.01); *B32B 2264/06* (2013.01); *B32B 2264/08* (2013.01); *B32B 2264/12* (2013.01); *B32B 2264/502* (2020.08); *B32B 2307/7145* (2013.01); *B32B 2307/7265* (2013.01); *B32B 2307/73* (2013.01); *B32B 2439/70* (2013.01)

(58) Field of Classification Search
    CPC ............ B32B 2264/06; B32B 2264/08; B32B 2264/12; B32B 2307/7145; B32B 2307/7265; B32B 2307/73; B32B 2439/70
    See application file for complete search history.

(56) References Cited

OTHER PUBLICATIONS

Fei Liu et al., Controlled-release of tea polyphenol from gelatin films incorporated with different ratios of free-nanoencapsulated tea polyphenols into fatty food simulants, 1-10, 2017 (Year: 2017).*
Wang et al., Fabrication and characterization of multilayered kafirin-gelatin film with one-way water barrier property, 1-10, 2018 (Year: 2018).*
"International Search Report (Form PCT/ISA/210) of PCT/CN2020/100484", mailed on Sep. 29, 2020, with English translation thereof, pp. 1-4.
Chen Xia, et al., "Multilayer zein/gelatin films with tunable water barrier property and prolonged antioxidant activity," Food Packaging and Shelf Life, vol. 19, Dec. 2018, pp. 76-85.

* cited by examiner

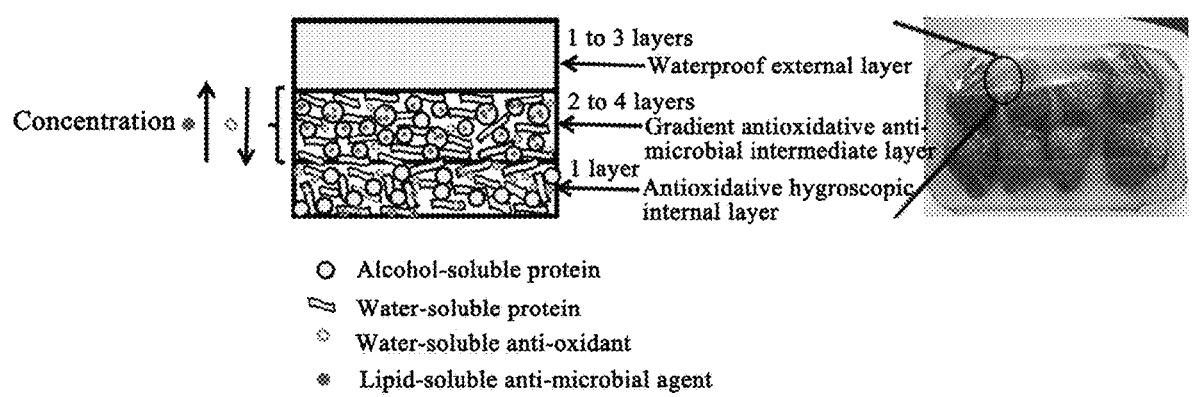

GRADIENT SLOW-RELEASE ACTIVE COMPOSITE FILM AND PREPARATION METHOD THEREOF

CROSS-REFERENCE TO RELATED APPLICATION

This application is a 371 of international application of PCT application serial no. PCT/CN2020/100484, filed on Jul. 6, 2020, which claims the priority benefit of China application no. 201910472015.0, filed on May 31, 2019. The entirety of each of the above mentioned patent applications is hereby incorporated by reference herein and made a part of this specification.

BACKGROUND

Technical Field

The present invention belongs to the technical field of active packaging materials, and specifically relates to a gradient slow-release active composite film and a preparation method thereof.

Description of Related Art

With the enhancing global environmental consciousness, edible packaging film with suitable moisture resistance, oxidation resistance and anti-microbial property draws a research boom. Compared with other edible packaging films, the protein-based film is highly popular in the field of food packaging for having good air permeability and mechanical property, and serving as a carrier of active compounds. But the protein-based edible film generally has drawbacks such as poor mechanical performance and poor moisture resistance. These drawbacks restrict the application of protein film in fresh-keeping packaging of food.

Chinese patent document CN 108163369 A discloses a one-way moisture-resistant multi-layer edible film and a preparation method thereof. The one-way moisture-resistant multi-layer edible film, from outside to inside, is composed of a hydrophobic external layer, a mechanical property-adjustable intermediate transition layer and a hydrophilic internal layer, wherein the hydrophobic external layer is composed of 1 to 3 hydrophobic alcohol-soluble protein layers, the hydrophilic internal layer is composed of 1 to 3 hydrophilic water-soluble protein layers, and the intermediate transition layer is composed of a mixture of an alcohol-soluble protein and a water-soluble protein. By compositing the alcohol-soluble protein having good moisture resistance with the water-soluble protein having good water-retaining property to serve as a substrate of the multi-layer edible film, the multi-layer edible film prepared has one-way moisture resistance and good mechanical performance. However, at present, for the reason that a water-soluble antioxidant is mainly loaded to a hydrophilic substrate while a lipid-soluble anti-microbial essential oil is mainly loaded to a hydrophobic substrate, and compatibility of these two is poor, only one kind of anti-oxidant or anti-microbial agent can be added to the edible film alone, and thus it is difficult to achieve the best fresh-keeping effect of oxidation resistance and anti-microbial property simultaneously, and duration of the anti-oxidant effect and anti-microbial effect is short.

Therefore, it is of great significance in the aspects of accelerating the development of food preservation and fresh-keeping technology and providing a new-type of packaging material to effectively composite the protein substrates with different properties with active substances, so that the anti-oxidant and the anti-microbial agent can be loaded to the same film system having long-term oxidation resistance and anti-microbial property.

SUMMARY

The technical problem to be solved by the present invention is to overcome the above-mentioned deficiencies and drawbacks of the existing active films, and to provide a gradient slow-release active composite film, wherein for the first time a lipid-soluble plant essential oil and a water-soluble antioxidant are loaded to an alcohol-soluble protein-water-soluble protein substrate in the same film system, and the gradient slow-release active composite film can be obtained by suitable compounding technology, which achieves effects of a long-term oxidation resistance and a long-term anti-microbial property simultaneously on the packaging materials, has excellent moisture resistance and good mechanical performance, with extensive sources of raw materials, easy-operational processing technology, low energy consumption and high efficiency, and can be widely used in industries such as food packaging.

Another objective of the present invention is to provide a preparation method of the gradient slow-release active composite film.

The objectives of the present invention are achieved by the following technical solutions.

A gradient slow-release active composite film, from inside to outside, is composed of an antioxidative hygroscopic internal layer, at least one gradient anti-microbial antioxidative intermediate layer and at least one waterproof external layer; wherein the antioxidative hygroscopic internal layer is prepared by an alcohol-soluble protein-water-soluble protein substrate and a water-soluble antioxidant; the gradient anti-microbial antioxidative intermediate layer is prepared by an alcohol-soluble protein-water-soluble protein substrate and a lipid-soluble plant essential oil and a water-soluble antioxidant, wherein a mass ratio of the alcohol-soluble protein to the water-soluble protein is (1-2):(1-2), a mass percentage of the lipid-soluble plant essential oil is 2-10 wt %, a mass percentage of the water-soluble antioxidant is 1-8 wt %; and the waterproof external layer is composed of a hydrophobic alcohol-soluble protein layer.

In a preferable embodiment of the present invention, from the perspectives of long-term effects of oxidation resistance and anti-microbial property, the moisture resistance and the mechanical performance of the composite film, in the gradient anti-microbial antioxidative intermediate layer, the mass ratio of the alcohol-soluble protein to the water-soluble protein is 1:(1-2), more preferably 1:2.

Preferably, in the antioxidative hygroscopic internal layer, a mass percentage of the water-soluble antioxidant is 8-12 wt %.

More preferably, in the antioxidative hygroscopic internal layer, the mass percentage of the water-soluble antioxidant is 9-10 wt %.

Preferably, in the antioxidative hygroscopic internal layer, a mass percentage of a mixture of the alcohol-soluble protein and the water-soluble protein is 20-40 wt %, wherein a mass ratio of the alcohol-soluble protein to the water-soluble protein is 1:(2-3).

More preferably, in the antioxidative hygroscopic internal layer, the mass percentage of the mixture of the alcohol-soluble protein and the water-soluble protein is 25-30 wt %. At this moment, by ensuring the effects of long-term antimicrobial property and oxidation resistance, the active composite film has relatively good moisture resistance and mechanical performance simultaneously.

Preferably, in the gradient anti-microbial antioxidative intermediate layer, a mass percentage of a mixture of the alcohol-soluble protein and the water-soluble protein is 18-35 wt %; in the waterproof external layer, a mass percentage of the hydrophobic alcohol-soluble protein is 15-25 wt %.

More preferably, in the gradient anti-microbial antioxidative intermediate layer, the mass percentage of the mixture of the alcohol-soluble protein and the water-soluble protein is 20-28 wt %; in the waterproof external layer, the mass percentage of the hydrophobic alcohol-soluble protein is 18-22 wt %.

Preferably, a number of the gradient anti-microbial antioxidative intermediate layer is 2 to 4, a content of the lipid-soluble plant essential oil progressively increases from inside to outside and layer by layer, and a content of the water-soluble antioxidant progressively decreases from inside to outside and layer by layer.

More preferably, the number of the gradient anti-microbial antioxidative intermediate layer is 3; from inside to outside, in a first intermediate layer, the mass percentage of the water-soluble antioxidant is 7-8 wt %, the mass percentage of the lipid-soluble plant essential oil is 2-4 wt %; in a second intermediate layer, the mass percentage of the water-soluble antioxidant is 4-6 wt %, the mass percentage of the lipid-soluble plant essential oil is 5-7 wt %; and in a third intermediate layer, the mass percentage of the water-soluble antioxidant is 1-3 wt %, the mass percentage of the lipid-soluble plant essential oil is 8-10 wt %.

Preferably, a number of the waterproof external layer is 1 to 3.

Preferably, the alcohol-soluble protein is one of or a mixture of two or more of zein, wheat gliadin, hordein, kafirin and proso millet prolamin; the water-soluble protein is one of or a mixture of two or more of soybean protein, whey protein, casein, gelatin and broad bean protein. According to the present invention, suitable alcohol-soluble protein and water-soluble protein that can be used include but are not limited to these.

More preferably, the alcohol-soluble protein is zein, and the water-soluble protein is gelatin (preferably gelatin A. i.e. type A gelatin).

Preferably, the lipid-soluble plant essential oil is one of or a mixture of two or more of oregano essential oil, cinnamon essential oil, clove essential oil, peppermint essential oil, thyme essential oil, tea tree essential oil, rosemary essential oil, citronella essential oil, wild rose essential oil, sweet orange essential oil, *eucalyptus* essential oil or rose essential oil; and the water-soluble antioxidant is one or a mixture of tea polyphenol, grape polyphenol, red wine polyphenol, apple polyphenol, rosmarinic acid, antioxidant of bamboo leaf and vitamin C. According to the present invention, suitable water-soluble antioxidant and lipid-soluble plant essential oil that can be used include but are not limited to these.

The present invention further provides an article which includes the above-mentioned active composite film or is prepared by the above-mentioned active composite film. The article is a packaging bag or a packaging film.

The present invention further provides a preparation method of the active composite film, which includes the following steps:

S1, preparation of a stock solution of the antioxidative hygroscopic internal layer: dissolving the water-soluble protein and the water-soluble antioxidant in an aqueous solution of an organic solvent, then adding the alcohol-soluble protein to obtain the stock solution of the antioxidative hygroscopic internal layer;

S2, preparation of a stock solution of the gradient anti-microbial antioxidative intermediate layer: dissolving the water-soluble protein and the water-soluble antioxidant in an aqueous solution of an organic solvent, adding the alcohol-soluble protein and the lipid-soluble plant essential oil to obtain the stock solution of the gradient anti-microbial antioxidative intermediate layer;

S3, preparation of a stock solution of the waterproof external layer: dissolving the alcohol-soluble protein in an organic solvent to obtain the stock solution of the waterproof external layer; and S4, film-forming by casting: casting layer by layer, or casting-co-calendering in separate layers, the stock solutions of steps S1, S2, S3 according to the progressively increasing or decreasing contents of water-soluble antioxidant, to obtain a gradient slow-release active composite film containing multi-layer of cast films.

In some implementations, the organic solvent includes acetic acid, ethanol, propionic acid, butyric acid or a mixture thereof.

Preferably, the aqueous solutions of organic solvent in steps S1 and S2 are an 80% acetic acid aqueous solution and/or a 75% propionic acid aqueous solution, and the organic solvent in step S3 is a 100% acetic acid or 100% propionic acid.

Preferably, a cast velocity is 0.05-0.2 m/s, a cast temperature is 50° C. to 90° C.; and a thickness of each layer of cast film is controlled to 10-20 μm.

More preferably, the cast velocity is 0.05-0.1 m/s, and the cast temperature is 70° C. to 80° C.

Preferably, the plasticizer is one or more of glycerol, water, oleic acid and polyethylene glycol. According to the present invention, suitable plasticizer that can be used includes but is not limited to glycerol, water, oleic acid and polyethylene glycol.

More preferably, the plasticizer is glycerol.

Preferably, in the above steps S1 and S2, after adding the water-soluble antioxidant and the lipid-soluble plant essential oil, magnetic stirring is carried out for 30 minutes for each step before mixing.

Preferably, in the above steps S1, S2 and S3, after adding the plasticizer, magnetic stirring is carried out for 1.5 to 2 hours for each step to enable each component in the stock solution to be mixed sufficiently.

Preferably, the gradient slow-release active composite film prepared in step S4 is cooled and dried naturally at 20° C. to 30° C., and stored in a relative humidity of 40% to 60%.

Compared with the prior art, the present invention has the following beneficial effects.

1. The present invention provides a gradient slow-release active composite film and a preparation method thereof. For the gradient slow-release active composite film, it is the first time that a lipid-soluble plant essential oil and a water-soluble antioxidant are loaded to an alcohol-soluble protein-water-soluble protein substrate in the same film system, and in a manner of combining an organic solvent method and a casting method, the gradient slow-release active composite film is prepared by the technologies of casting layer by layer or casting-co-calendering in separate layers as well as gradient loading of active substances, wherein retention rates of the antioxidant and the essential oil can be improved, and long-term oxidation resistance and long-term anti-microbial property can be achieved simultaneously.

2. In the gradient slow-release active composite film according to the present invention, the essential oil can be encapsulated in a structural body of the alcohol-soluble protein, and further encapsulated in a water-soluble protein system to realize a double-encapsulation structure for the essential oil and achieve an effect of long-term controlled release. The water-soluble antioxidant is loaded to the water-soluble protein at the same time, which is conducive to the rapid release thereof to inhibit the initial oxidative browning.

3. The gradient slow-release active composite film according to the present invention also has a one-way moisture resistance function which can effectively prevent the moisture within the package from running off and moisture in the air from entering, and can solve the problem of condensation, having a potential application prospect in fields such as packaging material.

4. The gradient slow-release active composite film according to the present invention is a multi-layer composite film structure. By the preparation method of the active composite film according to the present invention, excellent cohesiveness between each film layer can be ensured without the addition of adhesive, which enables the active composite film to have suitable tensile strength and breaking strength.

5. The casting method is used in the present invention to form an article, which has advantages such as high level of continuation and short production cycle, and can realize a large-scale industrial production with controllable film-forming technology, and the thickness of the cast film prepared can be adjusted at will, so as to widely applied in industries such as food packaging.

6. Additionally, the gradient slow-release active composite film according to the present invention provides a novel practical method for research and application of edible packaging materials.

BRIEF DESCRIPTION OF THE DRAWINGS

FIG. 1 is a packaging effect diagram and a structural diagram of a gradient slow-release active composite film wrapping strawberries.

DESCRIPTION OF THE EMBODIMENTS

The present invention is further described below in combination with the accompanied drawing and specific embodiments. The following embodiments are preferable implementations of the present invention, but the scope of protection of the present invention is not limited thereto in any forms. Unless specified, reagents, methods and equipment used in the present invention are conventional reagents, methods and equipment in the art.

Unless specified, reagents and materials used in the following embodiments are commercially available.

Embodiment 1 Active Composite Film a

A gradient slow-release active composite film A was prepared by the following steps:
(1) preparation of a stock solution of an antioxidative hygroscopic internal layer: in a condition of 55° C. 8 g of gelatin and 1.3 g of tea polyphenol were dissolved in 38 mL of 80% acetic acid aqueous solution, followed by magnetic stirring to sufficiently mix for 0.5 hour; and then 4 g of zein and 0.5 g of glycerol were added, followed by magnetic stirring to sufficiently mix for 2 hours;
(2) preparation of a stock solution of a gradient antimicrobial antioxidative intermediate layer: 4 g of gelatin and tea polyphenol with different mass fractions were dissolved in 20 mL of 80% acetic acid aqueous solution. 8 g of zein and rosemary essential oil with different mass fractions were dissolved in 18 mL of 80% acetic acid aqueous solution (i.e. a mass ratio of an alcohol-soluble protein to a water-soluble protein in the intermediate layer was 2:1), followed by magnetic stirring to sufficiently mix for 0.5 hour first; then two solutions were mixed. 0.6 g of glycerol was added, followed by magnetic stirring to sufficiently mix for 2 hours, and three stock solutions of which mass percentages of tea polyphenol+rosemary essential oil were 8%+2% (a first intermediate layer from inside to outside), 6%+4% (a second intermediate layer from inside to outside), and 2%+8% (a third intermediate layer from inside to outside), respectively, were obtained;
(3) preparation of a stock solution of a waterproof external layer: 12 g of zein was dissolved in 38 mL of 100% acetic acid, and 0.8 g of glycerol was added, followed by magnetic stirring to sufficiently mix for 2 hours; and
(4) film-forming by casting: according to the progressively layer by layer decreasing mass percentages of tea polyphenol from inside to outside and the progressively layer by layer increasing mass percentages of the rosemary essential oil from inside to outside, 5 stock solutions obtained in steps (1), (2), (3) were casted layer by layer, wherein a cast velocity was 0.05 m/s, a cast temperature was 75° C., a thickness of each layer of a cast film was 15 μm, and a gradient slow-release active composite film A containing 5 layers of cast films was obtained.

Embodiment 2 Active Composite Film B

A gradient slow-release active composite film B was prepared by the following steps:
(1) preparation of a stock solution of an antioxidative hygroscopic internal layer: in a condition of 55° C. 8 g of gelatin and 1.3 g of tea polyphenol were dissolved in 38 mL of 80% acetic acid aqueous solution, followed by magnetic stirring to sufficiently mix for 0.5 hour; and then 4 g of zein and 0.5 g of glycerol were added, followed by magnetic stirring to sufficiently mix for 2 hours;
(2) preparation of a stock solution of a gradient antimicrobial antioxidative intermediate layer: 6 g of gelatin and tea polyphenol with different mass fractions were dissolved in 20 mL of 80% acetic acid aqueous solution. 6 g of zein and rosemary essential oil with different mass fractions were dissolved in 18 mL of 80% acetic acid aqueous solution (i.e. a mass ratio of an alcohol-soluble protein to a water-soluble protein in the intermediate layer was 1:1), followed by magnetic stirring to sufficiently mix for 0.5 hour first; then two solutions were mixed. 0.6 g of glycerol was added, followed by magnetic stirring to sufficiently mix for 2 hours, and three stock solutions of which mass percentages of tea polyphenol+rosemary essential oil were 8%+2% (a first intermediate layer from inside to outside), 6%+4% (a second intermediate layer from inside to outside), and 2%+8% (a third intermediate layer from inside to outside), respectively, were obtained;

(3) preparation of a stock solution of a waterproof external layer: 12 g of zein was dissolved in 38 mL of 100% acetic acid, and 0.8 g of glycerol was added, followed by magnetic stirring to sufficiently mix for 2 hours; and (4) film-forming by casting: according to the progressively layer by layer decreasing mass percentages of tea polyphenol inside to outside and the progressively layer by layer increasing mass percentages of the rosemary essential oil from inside to outside, 5 stock solutions obtained in steps (1), (2), (3) were casted layer by layer, wherein a cast velocity was 0.05 m/s, a cast temperature was 75° C., a thickness of each layer of a cast film was 15 μm, and a gradient slow-release active composite film B containing 5 layers of cast films was obtained.

Embodiment 3 Active Composite Film C

A gradient slow-release active composite film C was prepared by the following steps:
(1) preparation of a stock solution of an antioxidative hygroscopic internal layer: in a condition of 55° C. 8 g of gelatin and 1.3 g of tea polyphenol were dissolved in 38 mL of 80% acetic acid aqueous solution, followed by magnetic stirring to sufficiently mix for 0.5 hour; and then 4 g of zein and 0.5 g of glycerol were added, followed by magnetic stirring to sufficiently mix for 2 hours;
(2) preparation of a stock solution of a gradient antimicrobial antioxidative intermediate layer: 8 g of gelatin and tea polyphenol with different mass fractions were dissolved in 20 mL of 80% acetic acid aqueous solution. 4 g of zein and rosemary essential oil with different mass fractions were dissolved in 18 mL of 80% acetic acid aqueous solution (i.e. a mass ratio of an alcohol-soluble protein to a water-soluble protein in the intermediate layer was 1:2), followed by magnetic stirring to sufficiently mix for 0.5 hour first; then two solutions were mixed. 0.6 g of glycerol was added, followed by magnetic stirring to sufficiently mix for 2 hours, and three stock solutions of which mass percentages of tea polyphenol+rosemary essential oil were 8%+2% (a first intermediate layer from inside to outside), 6%+4% (a second intermediate layer from inside to outside), and 2%+8% (a third intermediate layer from inside to outside), respectively, were obtained;
(3) preparation of a stock solution of a waterproof external layer: 12 g of zein was dissolved in 38 mL of 100% acetic acid, and 0.8 g of glycerol was added, followed by magnetic stirring to sufficiently mix for 2 hours; and
(4) film-forming by casting: according to the progressively layer by layer decreasing mass percentages of tea polyphenol from inside to outside and the progressively layer by layer increasing mass percentages of the rosemary essential oil from inside to outside, 5 stock solutions obtained in steps (1), (2), (3) were casted layer by layer, wherein a cast velocity was 0.05 m/s, a cast temperature was 75° C., a thickness of each layer of a cast film was 15 μm, and a gradient slow-release active composite film C containing 5 layers of cast films was obtained.

Embodiment 4 Active Composite Film D

A gradient slow-release active composite film D was prepared by the following steps:
(1) preparation of a stock solution of an antioxidative hygroscopic internal layer: in a condition of 55° C. 8 g of gelatin and 1.3 g of tea polyphenol were dissolved in 38 mL of 75% propionic acid aqueous solution, followed by magnetic stirring to sufficiently mix for 0.5 hour; and then 4 g of zein and 0.5 g of glycerol were added, followed by magnetic stirring to sufficiently mix for 1.5 hours;
(2) preparation of a stock solution of a gradient antimicrobial antioxidative intermediate layer: 8 g of gelatin and tea polyphenol with different mass fractions were dissolved in 20 mL of 75% propionic acid aqueous solution. 4 g of zein and rosemary essential oil with different mass fractions were dissolved in 18 mL of 75% propionic acid aqueous solution (i.e. a mass ratio of an alcohol-soluble protein to a water-soluble protein in the intermediate layer was 1:2), followed by magnetic stirring to sufficiently mix for 0.5 hour first; then two solutions were mixed, 0.6 g of glycerol was added, followed by magnetic stirring to sufficiently mix for 1.5 hours, and three stock solutions of which mass percentages of tea polyphenol+rosemary essential oil were 7%+4% (a first intermediate layer from inside to outside), 4%+7% (a second intermediate layer from inside to outside), and 3%+10% (a third intermediate layer from inside to outside), respectively, were obtained;
(3) preparation of a stock solution of a waterproof external layer: 12 g of zein was dissolved in 38 mL of 100% propionic acid, and glycerol with 3% solid matter mass was added, followed by magnetic stirring to sufficiently mix for 1.5 hours; and
(4) film-forming by casting: according to the progressively layer by layer decreasing mass percentages of tea polyphenol from inside to outside and the progressively layer by layer increasing mass percentages of the rosemary essential oil from inside to outside, 5 stock solutions obtained in steps (1), (2), (3) were casted layer by layer, wherein a cast velocity was 0.1 m/s, a cast temperature was 70° C., a thickness of each layer of a cast film was 10 μm, and a gradient slow-release active composite film D containing 5 layers of cast films was obtained.

Embodiment 5 Active Composite Film E

A gradient slow-release active composite film E was prepared by the following steps:
(1) preparation of a stock solution of an antioxidative hygroscopic internal layer: in a condition of 55° C. 8 g of gelatin and 1.3 g of tea polyphenol were dissolved in 38 mL of 80% acetic acid aqueous solution, followed by magnetic stirring to sufficiently mix for 0.5 hour; and then 4 g of zein and 0.5 g of glycerol were added, followed by magnetic stirring to sufficiently mix for 2 hours;
(2) preparation of a stock solution of a gradient antimicrobial antioxidative intermediate layer: 8 g of gelatin and tea polyphenol with a mass fraction of 8% were dissolved in 20 mL of 80% acetic acid aqueous solution, 4 g of zein and rosemary essential oil with a mass fraction of 8% were dissolved in 18 mL of 80% acetic acid aqueous solution, followed by magnetic stirring to sufficiently mix for 0.5 hour first; then two solutions were mixed, 0.6 g of glycerol was added, followed by magnetic stirring to sufficiently mix for 2 hours;
(3) preparation of a stock solution of a waterproof external layer: 12 g of zein was dissolved in 38 mL of 100% acetic acid, and 0.8 g of glycerol was added, followed by magnetic stirring to sufficiently mix for 2 hours; and
(4) film-forming by casting: 3 stock solutions obtained in steps (1), (2). (3) were casted layer by layer, wherein a cast velocity was 0.05 m/s, a cast temperature was 75° C., a thickness of each layer of a cast film was 15 μm, and a gradient slow-release active composite film E containing 3 layers of cast films was obtained.

Embodiment 6

In order to study effect of ratios of the alcohol-soluble protein (taking zein as an example) to the water-soluble protein (taking gelatin as an example) in different gradient anti-microbial antioxidative intermediate layer substrates on cohesiveness between each layers of the gradient slow-release active composite film, peel strength between each layers in the gradient slow-release active composite films A, B and C obtained in Embodiments 1, 2 and 3 was determined. Setting of experimental groups and experimental results are shown in Table 1.

TABLE 1

Variation of peel strength of the active composite films

| | Peel strength (N/mm) | |
|---|---|---|
| | Between the internal layer and the intermediate layer | Between the intermediate layer and the external layer |
| Active composite film A | 1.87 | 2.09 |
| Active composite film B | 2.31 | 2.75 |
| Active composite film C | 4.12 | 3.89 |

Results of Table 1 show that when the mass ratio of the alcohol-soluble protein to the water-soluble protein in the intermediate layer substrate is 1:2, peel strength between each layers in the obtained gradient slow-release active composite film C is 4.12 N/mm and 3.89 N/mm respectively, higher than the other experimental groups.

Embodiment 7

In order to enhance the mechanical strength of the gradient slow-release active composite film, to improve stability of the structure, and to ensure the film not be torn easily, effects of ratios of the alcohol-soluble protein to the water-soluble protein in different gradient anti-microbial antioxidative intermediate layers on tensile strength and elongation at break of the gradient slow-release active composite films A, B and C obtained in Embodiments 1, 2 and 3 were studied. Setting of experimental groups and experimental results are shown in Table 2.

Results of Table 2 show that when the mass ratio of the alcohol-soluble protein to the water-soluble protein in the intermediate layer substrate is 1:2, the transversal and longitudinal tensile strengths of the obtained active composite film C are 45.82 Mpa and 80.73 Mpa respectively, higher than other experimental groups.

Embodiment 8

In order to maintain the relative humidity within the active composite film and to reduce the volatilization of moisture from fruits and vegetables, effect of an exposed blank group and effects of ratios of the alcohol-soluble protein to the water-soluble protein in different gradient anti-microbial antioxidative intermediate layers on the moisture loss rates of kiwi fruit wrapped by the gradient slow-release active composite films A, B and C which were obtained in Embodiments 1, 2 and 3, were studied during preservation at 25° C. Setting of experimental groups and experimental results are shown in Table 3.

TABLE 3

Variation of moisture loss rates of the kiwi fruit wrapped by the active composite films

| | Loss rate (%) | | | |
|---|---|---|---|---|
| Number of days (day) | Blank group | Active composite film A | Active composite film B | Active composite film C |
| 0 | 0 | 0 | 0 | 0 |
| 2 | 20.53 | 10.25 | 9.71 | 7.98 |
| 4 | 40.37 | 18.92 | 16.87 | 13.35 |
| 6 | 60.64 | 32.66 | 27.59 | 20.85 |
| 8 | 80.17 | 41.34 | 34.18 | 28.27 |
| 10 | 87.92 | 49.29 | 42.79 | 37.54 |

Results of Table 3 show that the moisture loss rates of the sample groups are far less than the control group, indicating that the active composite film enables a suitable relative humidity to be maintained within the package, so as to effectively reduce the moisture loss rate of the kiwi fruit. Especially for the active composite film C, that is, when the mass ratio of the alcohol-soluble protein to the water-soluble protein in the intermediate layer substrate is 1:2, the moisture loss rate is the lowest.

Embodiment 9

In order to inhibit the surface of fruits and vegetables from browning and growth of microorganism, and so as to ensure the quality of fruits and vegetables and prolong the shelf life thereof, effect of an exposed blank group and effects of ratios

TABLE 2

Variation of mechanical strength of the active composite films

| Ratio of the alcohol-soluble protein to the water-soluble protein | Active composite film A | | Active composite film B | | Active composite film C | |
|---|---|---|---|---|---|---|
| | Transversal | Longitudinal | Transversal | Longitudinal | Transversal | Longitudinal |
| Elongation at break (%) | 82.98 | 180.55 | 131.12 | 275.08 | 211.74 | 400.65 |
| Tensile strength (Mpa) | 9.60 | 17.60 | 15.51 | 30.67 | 45.82 | 80.73 | of the alcohol-soluble protein to the water-soluble protein in different gradient anti-microbial antioxidative intermediate layers on the color variation of avocado and the total plate count of banana wrapped by the gradient slow-release active composite films A, B and C which were obtained in Embodiments 1, 2 and 3, were studied during preservation at 25° C. Setting of experimental groups and experimental results are shown in Table 4 (color variation, ΔE) and Table 5 (total plate count, TPC).

TABLE 4

Color variation of avocado wrapped by the active composite films

| Number of days (day) | Blank group | Active composite film A | Active composite film B | Active composite film C | Active composite film D | Active composite film E |
|---|---|---|---|---|---|---|
| | | | | ΔE | | |
| 0 | 0 | 0 | 0 | 0 | 0 | 0 |
| 2 | 12.35 | 9.25 | 8.17 | 7.07 | 7.68 | 8.12 |
| 4 | 26.33 | 16.36 | 15.72 | 11.68 | 13.77 | 16.89 |
| 6 | 35.18 | 24.47 | 21.83 | 15.24 | 19.14 | 25.37 |
| 8 | 44.25 | 33.73 | 29.91 | 20.76 | 25.71 | 34.09 |
| 10 | 53.97 | 37.15 | 33.62 | 25.90 | 30.69 | 42.56 |

TABLE 5

Variation of total plate count of banana wrapped by the active composite films

| Number of days (day) | Blank group | Active composite film A | Active composite film B | Active composite film C | Active composite film D | Active composite film E |
|---|---|---|---|---|---|---|
| | | | | TPC (lg(cfu/g)) | | |
| 0 | 2.15 | 2.15 | 2.15 | 2.15 | 2.15 | 2.15 |
| 2 | 3.49 | 1.64 | 1.65 | 1.78 | 1.69 | 1.73 |
| 4 | 4.92 | 1.76 | 2.08 | 2.20 | 1.84 | 2.49 |
| 6 | 6.22 | 2.88 | 2.59 | 2.16 | 2.05 | 2.97 |
| 8 | 7.07 | 3.12 | 3.04 | 2.93 | 2.46 | 3.78 |
| 10 | 8.34 | 3.89 | 3.47 | 3.34 | 3.02 | 4.37 |

Results of Table 4 show that compared with the avocado exposed to the ambience, browning and color variation of the surface of avocado can be effectively inhibited by the active composite films. It can be seen from the active composite films A, B and C that the color variation is reduced as the increasing content of gelatin loaded with tea polyphenol, that is, when the mass ratio of the alcohol-soluble protein to the water-soluble protein in the intermediate layer substrate is 1:2 (the active composite film C), the best oxidation resistance effect is provided; while it can be seen from the active composite films C and D that the oxidation resistance effect decreases as the content of antioxidant decreases; and the composite film E without gradient has poorer oxidation resistance effect than others with gradient. Results of Table 5 show that compared with the banana exposed to the ambience, the total plate count of the surface of banana can be effectively inhibited by the active composite films. It can be seen from the active composite films A, B and C that the total plate count increases as the decreasing content of alcohol-soluble protein loaded with plant essential oil during the first 4 days, during the latter 6 days, the total plate count increases as the decreasing content of alcohol-soluble protein loaded with plant essential oil, indicating that with encapsulation by a substrate in suitable ratio, release of essential oil can be effectively controlled and a long-term anti-microbial effect can be obtained; while it can be seen from the active composite films C and D that the anti-microbial effect is enhanced as the content of anti-microbial agent increases; and the composite film E without gradient has poorer anti-microbial effect than others with gradient. In conclusion, with regard to the same concentration gradient, when the mass ratio of the alcohol-soluble protein to the water-soluble protein in the intermediate layer substrate is 1:2, the best comprehensive effect of and anti-microbial property can be achieved; with different concentration gradients, the oxidation resistance effect and the anti-microbial effect are different, wherein the anti-microbial effect of the active composite film D is better than the active composite film C, but the oxidation resistance effect of the active composite film D is poorer than the active composite film C; and to sum up, the active composite film E with one single gradient anti-microbial antioxidative intermediate layer has shorter effectiveness of oxidation resistance and anti-microbial property than the other active composite films A, B, C and D with gradient.

In the above-mentioned embodiments, in addition to the rosemary essential oil, plant essential oil such as oregano essential oil, cinnamon essential oil, clove essential oil, peppermint essential oil, thyme essential oil, tea tree essential oil, citronella essential oil, wild rose essential oil, sweet orange essential oil, *eucalyptus* essential oil and rose essential oil can also be selected as the lipid-soluble plant essential oil. In addition to tea polyphenol, water-soluble antioxidants such as rosmarinic acid, antioxidant of bamboo leaf and vitamin C can also be selected as the water-soluble antioxidant. In addition to zein, hydrophobic alcohol-soluble proteins such as wheat gliadin, hordein, kafirin and proso millet prolamin can also be selected as the alcohol-soluble protein. In addition to gelatin, hydrophilic water soluble proteins such as soybean protein, whey protein, casein and broad bean protein can also be selected as the water-soluble protein. It is found by the inventors through experiments that the above several kinds of lipid-soluble plant essential oil, water-soluble antioxidants, alcohol-soluble proteins and water-soluble proteins have acceptable effects, and substrates of other lipid-soluble plant essential oil and water-soluble antioxidants are worse than the former.

Implementations of the present invention have been described in detail above, but they are only examples for ease of understanding, and should not be regarded as restriction to the scope of the present invention. Similarly, any technical personnel skilled in the art can make various possible equivalent changes or substitutions based on the description of the technical solution of the present invention and its preferred embodiments, but all these changes or substitutions shall fall within the scope of protection of claimed by the present invention.

What is claimed is:

1. A gradient slow-release active composite film, wherein the film, from inside to outside, is composed of an antioxidative hygroscopic internal layer, at least one gradient anti-microbial antioxidative intermediate layer and at least one waterproof external layer;
   wherein the antioxidative hygroscopic internal layer is prepared by an alcohol-soluble protein-water-soluble protein substrate and a water-soluble antioxidant;
   the gradient anti-microbial antioxidative intermediate layer is prepared by an alcohol-soluble protein-water-soluble protein substrate and a lipid-soluble plant essential oil and a water-soluble antioxidant, wherein a mass ratio of the alcohol-soluble protein to the water-soluble protein is (1-2):(1-2), a mass percentage of the lipid-soluble plant essential oil is 2-10 wt %, a mass percentage of the water-soluble antioxidant is 1-8 wt %; and the waterproof external layer is composed of a hydrophobic alcohol-soluble protein layer,
- wherein a content of the lipid-soluble plant essential oil progressively increases from inside to outside and layer by layer, a content of the water-soluble antioxidant progressively decreases from inside to outside and layer by layer,
- wherein a number of the gradient anti-microbial antioxidative intermediate layer is 3, and the gradient anti-microbial antioxidative intermediate layer includes a first intermediate layer, a second intermediate layer and a third intermediate layer,
- wherein the mass percentage of the lipid-soluble plant essential oil is 2-4 wt % in the first intermediate layer, the mass percentage of the lipid-soluble plant essential oil is 5-7 wt % in the second intermediate layer, and the mass percentage of the lipid-soluble plant essential oil is 8-10 wt % in the third intermediate layer,
- wherein the alcohol-soluble protein is one of or a mixture of two or more of zein, wheat gliadin, hordein, and proso millet prolamin.

2. An article, comprising or prepared by using the active composite film according to claim 1.

3. The gradient slow-release active composite film according to claim 1, wherein in the antioxidative hygroscopic internal layer, a mass percentage of the water-soluble antioxidant is 8-12 wt %.

4. The gradient slow-release active composite film according to claim 3, wherein in the antioxidative hygroscopic internal layer, a mass percentage of a mixture of the alcohol-soluble protein and the water-soluble protein is 20-40 wt %, wherein a mass ratio of the alcohol-soluble protein to the water-soluble protein is 1:(2-3).

5. An article, comprising or prepared by using the active composite film according to claim 4.

6. A preparation method of the active composite film according to claim 4, wherein the method comprises the following steps:
- step S1, preparation of a stock solution of the antioxidative hygroscopic internal layer: dissolving the water-soluble protein and the water-soluble antioxidant in an aqueous solution of an organic solvent, then adding the alcohol-soluble protein to obtain the stock solution of the antioxidative hygroscopic internal layer;
- step S2, preparation of a stock solution of the gradient anti-microbial antioxidative intermediate layer: dissolving the water-soluble protein and the water-soluble antioxidant in an aqueous solution of an organic solvent, adding the alcohol-soluble protein and the lipid-soluble plant essential oil to obtain the stock solution of the gradient anti-microbial antioxidative intermediate layer;
- step S3, preparation of a stock solution of the waterproof external layer: dissolving the alcohol-soluble protein in an organic solvent to obtain the stock solution of the waterproof external layer; and
- step S4, film-forming by casting: casting layer by layer, or casting-co-calendering in separate layers, the stock solutions of the step S1, the step S2, and the step S3 according to the progressively increasing or decreasing contents of water-soluble antioxidant, to obtain the gradient slow-release active composite film containing multi-layer of cast films.

7. An article, comprising or prepared by using the active composite film according to claim 3.

8. A preparation method of the active composite film according to claim 3, wherein the method comprises the following steps:
- step S1, preparation of a stock solution of the antioxidative hygroscopic internal layer: dissolving the water-soluble protein and the water-soluble antioxidant in an aqueous solution of an organic solvent, then adding the alcohol-soluble protein to obtain the stock solution of the antioxidative hygroscopic internal layer;
- step S2, preparation of a stock solution of the gradient anti-microbial antioxidative intermediate layer: dissolving the water-soluble protein and the water-soluble antioxidant in an aqueous solution of an organic solvent, adding the alcohol-soluble protein and the lipid-soluble plant essential oil to obtain the stock solution of the gradient anti-microbial antioxidative intermediate layer;
- step S3, preparation of a stock solution of the waterproof external layer: dissolving the alcohol-soluble protein in an organic solvent to obtain the stock solution of the waterproof external layer; and
- step S4, film-forming by casting: casting layer by layer, or casting-co-calendering in separate layers, the stock solutions of the step S1, the step S2, and the step S3 according to the progressively increasing or decreasing contents of water-soluble antioxidant, to obtain the gradient slow-release active composite film containing multi-layer of cast films.

9. The gradient slow-release active composite film according to claim 1, wherein in the gradient anti-microbial antioxidative intermediate layer, a mass percentage of a mixture of the alcohol-soluble protein and the water-soluble protein is 18-35 wt %; in the waterproof external layer, a mass percentage of the hydrophobic alcohol-soluble protein is 15-25 wt %.

10. An article, comprising or prepared by using the active composite film according to claim 9.

11. A preparation method of the active composite film according to claim 9, wherein the method comprises the following steps:
- step S1, preparation of a stock solution of the antioxidative hygroscopic internal layer: dissolving the water-soluble protein and the water-soluble antioxidant in an aqueous solution of an organic solvent, then adding the alcohol-soluble protein to obtain the stock solution of the antioxidative hygroscopic internal layer;
- step S2, preparation of a stock solution of the gradient anti-microbial antioxidative intermediate layer: dissolving the water-soluble protein and the water-soluble antioxidant in an aqueous solution of an organic solvent, adding the alcohol-soluble protein and the lipid-soluble plant essential oil to obtain the stock solution of the gradient anti-microbial antioxidative intermediate layer;
- step S3, preparation of a stock solution of the waterproof external layer: dissolving the alcohol-soluble protein in an organic solvent to obtain the stock solution of the waterproof external layer; and
- step S4, film-forming by casting: casting layer by layer, or casting-co-calendering in separate layers, the stock solutions of the step S1, the step S2, and the step S3 according to the progressively increasing or decreasing contents of water-soluble antioxidant, to obtain the gradient slow-release active composite film containing multi-layer of cast films.

12. The gradient slow-release active composite film according to claim 1, wherein a number of the waterproof external layer is 1 to 3.

13. An article, comprising or prepared by using the active composite film according to claim 12.

14. A preparation method of the active composite film according to claim 12, wherein the method comprises the following steps:
   step S1, preparation of a stock solution of the antioxidative hygroscopic internal layer: dissolving the water-soluble protein and the water-soluble antioxidant in an aqueous solution of an organic solvent, then adding the alcohol-soluble protein to obtain the stock solution of the antioxidative hygroscopic internal layer;
   step S2, preparation of a stock solution of the gradient anti-microbial antioxidative intermediate layer: dissolving the water-soluble protein and the water-soluble antioxidant in an aqueous solution of an organic solvent, adding the alcohol-soluble protein and the lipid-soluble plant essential oil to obtain the stock solution of the gradient anti-microbial antioxidative intermediate layer;
   step S3, preparation of a stock solution of the waterproof external layer: dissolving the alcohol-soluble protein in an organic solvent to obtain the stock solution of the waterproof external layer; and
   step S4, film-forming by casting: casting layer by layer, or casting-co-calendering in separate layers, the stock solutions of the step S1, the step S2, and the step S3 according to the progressively increasing or decreasing contents of water-soluble antioxidant, to obtain the gradient slow-release active composite film containing multi-layer of cast films.

15. The gradient slow-release active composite film according to claim 1, wherein
   the water-soluble protein is one of or a mixture of two or more of soybean protein, whey protein, casein, gelatin and broad bean protein;
   the lipid-soluble plant essential oil is one of or a mixture of two or more of oregano essential oil, cinnamon essential oil, clove essential oil, peppermint essential oil, thyme essential oil, tea tree essential oil, rosemary essential oil, citronella essential oil, wild rose essential oil, sweet orange essential oil, *eucalyptus* essential oil and rose essential oil; and
   the water-soluble antioxidant is one of or a mixture of two or more of tea polyphenol, grape polyphenol, red wine polyphenol, apple polyphenol, rosmarinic acid, antioxidant of bamboo leaf and vitamin C.

16. An article, comprising or prepared by using the active composite film according to claim 15.

17. A preparation method of the active composite film according to claim 15, wherein the method comprises the following steps:
   step S1, preparation of a stock solution of the antioxidative hygroscopic internal layer: dissolving the water-soluble protein and the water-soluble antioxidant in an aqueous solution of an organic solvent, then adding the alcohol-soluble protein to obtain the stock solution of the antioxidative hygroscopic internal layer;
   step S2, preparation of a stock solution of the gradient anti-microbial antioxidative intermediate layer: dissolving the water-soluble protein and the water-soluble antioxidant in an aqueous solution of an organic solvent, adding the alcohol-soluble protein and the lipid-soluble plant essential oil to obtain the stock solution of the gradient anti-microbial antioxidative intermediate layer;
   step S3, preparation of a stock solution of the waterproof external layer: dissolving the alcohol-soluble protein in an organic solvent to obtain the stock solution of the waterproof external layer; and
   step S4, film-forming by casting: casting layer by layer, or casting-co-calendering in separate layers, the stock solutions of the step S1, the step S2, and the step S3 according to the progressively increasing or decreasing contents of water-soluble antioxidant, to obtain the gradient slow-release active composite film containing multi-layer of cast films.

18. A preparation method of the active composite film according to claim 1, wherein the method comprises the following steps:
   step S1, preparation of a stock solution of the antioxidative hygroscopic internal layer: dissolving the water-soluble protein and the water-soluble antioxidant in an aqueous solution of an organic solvent, then adding the alcohol-soluble protein to obtain the stock solution of the antioxidative hygroscopic internal layer;
   step S2, preparation of a stock solution of the gradient anti-microbial antioxidative intermediate layer: dissolving the water-soluble protein and the water-soluble antioxidant in an aqueous solution of an organic solvent, adding the alcohol-soluble protein and the lipid-soluble plant essential oil to obtain the stock solution of the gradient anti-microbial antioxidative intermediate layer;
   step S3, preparation of a stock solution of the waterproof external layer: dissolving the alcohol-soluble protein in an organic solvent to obtain the stock solution of the waterproof external layer; and
   step S4, film-forming by casting: casting layer by layer, or casting-co-calendering in separate layers, the stock solutions of the step S1, the step S2, and the step S3 according to the progressively increasing or decreasing contents of water-soluble antioxidant, to obtain the gradient slow-release active composite film containing multi-layer of cast films.

19. The preparation method of the active composite film according to claim 18, wherein a cast velocity is 0.05-0.2 m/s, a cast temperature is 50° C. to 90° C.; and a thickness of each layer of cast film is controlled to 10-20 μm.

20. The preparation method of the active composite film according to claim 18, wherein the antioxidative hygroscopic internal layer, the gradient anti-microbial antioxidative intermediate layer and the waterproof external layer further comprise a plasticizer, and an addition amount of the plasticizer accounts for 10% to 30% of a mass of solid matters.

* * * * *